No. 633,680. Patented Sept. 26, 1899.
D. H. BRADLEE.
TIRE.
(Application filed Mar. 2, 1899.)

(No Model.)

Witnesses:
Jas. J. Maloney
Nancy G. Ford

Inventor,
Dudley H. Bradlee.
by J. P. and H. J. Livermore
Att'ys.

United States Patent Office.

DUDLEY H. BRADLEE, OF MEDFORD, MASSACHUSETTS, ASSIGNOR, BY DIRECT AND MESNE ASSIGNMENTS, TO THE NEW ENGLAND RUBBER TIRE WHEEL COMPANY, OF WEST VIRGINIA.

TIRE.

SPECIFICATION forming part of Letters Patent No. 633,680, dated September 26, 1899.

Application filed March 2, 1899. Serial No. 707,500. (No model.)

*To all whom it may concern:*

Be it known that I, DUDLEY H. BRADLEE, of Medford, county of Middlesex, and State of Massachusetts, have invented an Improvement in Tires, of which the following description, in connection with the accompanying drawings, is a specification, like letters on the drawings representing like parts.

The present invention relates to a tire for vehicle-wheels, and is mainly embodied in novel means for fastening a tire of resilient material, such as rubber, to the rim or felly of the wheel.

The invention is shown as embodied in a rubber tire of the shape now commonly used with carriage-wheels, the tire being contained in a channel-iron, which is secured directly to the surface of the felly in the place of the ordinary steel tire. The fastening device for the rubber tire comprises a strip of steel or other suitable material extending lengthwise through a suitable opening in the rubber, and in accordance with the invention the ends of said fastening-strip are arranged to be connected together by means of an independent fastening device and held in engagement with said fastening device by means of a retaining member or bolt, thereby practically constituting an endless band extending wholly around the wheel. The independent fastening device is shown as consisting of a loop or ring of suitable material, and the ends of the strip are bent downward or shouldered, so as to hook into the said ring, which rests upon the surface of the channel-iron. When the ends of the strip are thus engaged, therefore, it is obvious that the holding strain is entirely taken care of by the endless band formed by said strip and said fastening device, it being necessary, however, to provide means for keeping the ends of the strip in engagement with the said fastening device. To this end a retaining member, such as a bolt, is passed through the ring between the ends of the strip and provided with a head overlapping the said ends, the said member being shown as extending through the rim of the wheel and being fastened, as by a nut.

Figure 1:
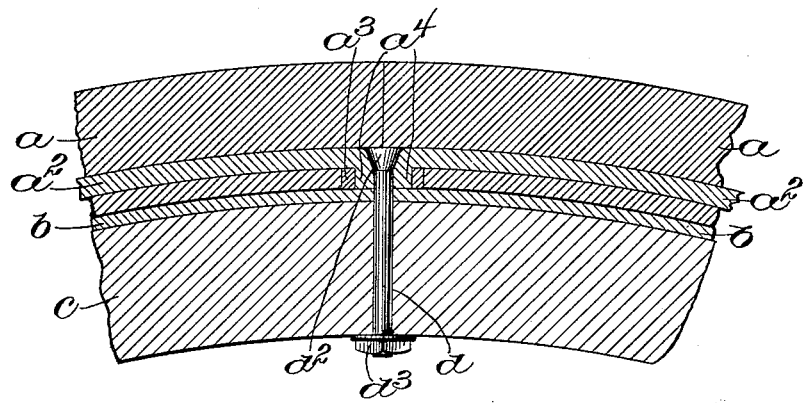
Figure 2:
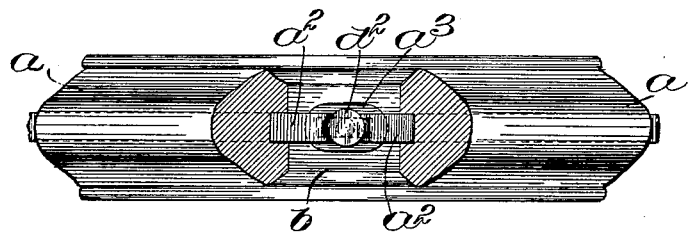
Figure 3:
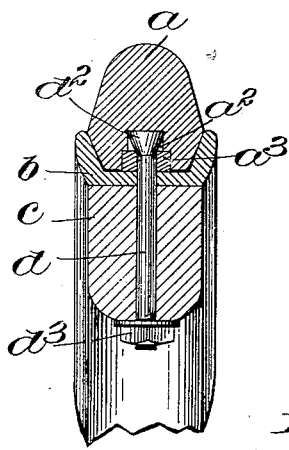

Figure 1 is a longitudinal section of a portion of the wheel rim and tire, showing the fastening device. Fig. 2 is a top plan view of the same with the rubber tire cut away so as to expose the fastening device, and Fig. 3 is a transverse section through the middle of that portion of the wheel which is shown in Fig. 1.

The rubber tire $a$, which is of the usual shape, is adapted to be contained in and laterally supported by the channel-iron $b$, which is properly secured to the rim or felly $c$ of the wheel. To fasten the tire in the channel-iron, it is provided with a fastening-strip $a^2$, extending longitudinally through the tire, the said strip being slightly shorter than the tire, so that the ends of the tire will be drawn snugly together when the tire is fastened, as shown in Fig. 1. To secure the ends of the strip $a^2$ together, and thereby afford a practically continuous fastening-band to hold the tire in place, the ends of said strip coöperate with an independent fastening device $a^3$, herein shown as a loop or ring of metal, and the ends of the strip are shouldered or offset, so as to hook into the said ring, thus having, as it were, shoulders $a^4$, which engage the opposite inner surfaces of the ring $a^3$. The strip being embedded in the rubber is obviously separated by a thickness of rubber from the surface of the channel-iron, and the ends are shown as bent downward to form the shoulders $a^4$, the said ends thus extending toward the bottom of the channel-iron. The independent fastening device or ring $a^3$ is thus adapted to lie in the space between the body of the band and the surface of the channel-iron and, as best shown in Fig. 2, occupies a very small space, so that it is unnecessary to cut away any substantial portion of the rubber at the point where the band is fastened.

The strip $a^2$ and the ring $a^3$ when once engaged with each other obviously form an endless band, and thereby constitute complete means for holding the tire in position and taking up substantially all of the fastening strain. It is necessary, however, that these parts should be held in engagement with each other, and for this purpose a retaining member $d$ is employed, the said retaining member being shown as consisting of a bolt having an enlarged head $d^2$, which is adapted to overlie and engage the ends of the strip $a^2$, while the body of the bolt extends between the said ends and through the ring $a^3$ and also through a suitable opening in the rim $c$, being secured in place by means of a nut $d^3$, as shown in Figs. 1 and 3.

As shown, the head $d^2$ of the bolt may be tapered and the ends of the band countersunk, so that the head of the bolt does not extend above the upper surface of the strip, and no rubber has to be cut away above the strip at the point where the ends of the tire are drawn together It will be seen that the fastening is completely independent of the channel-iron, which does not require to be cut or weakened in any way, while the retaining device may be one of the ordinary tie-bolts, of which several are commonly used to aid in keeping the channel-iron in place.

The tire may be easily applied and fastened, while the fastening device is light and neat, yet very secure.

I claim—

1. The combination with a resilient tire, of a channel-iron to laterally retain the same, a fastening-strip extending longitudinally through said tire and provided at its ends with rigid engaging portions, a fastening member independent of said strip and said channel-iron, but adapted to coöperate with said engaging portions to connect the ends of said strip and form therewith a continuous fastening-band, and means for retaining said fastening member in engagement with the engaging portions of said strip.

2. The combination with a rubber tire; of a channel-iron to laterally retain said tire, a fastening-strip extending longitudinally through the said tire; a fastening device independent of said strip and of the wheel-rim or channel-iron to connect the ends of said fastening-strip together and form an endless band; and a retaining member to keep the said fastening device in position, substantially as described.

3. The combination with a rubber tire; of a fastening-strip extending longitudinally through the same and provided at its ends with transverse shoulders; a fastening device comprising a separate member independent of the wheel-rim or channel-iron to coöperate with said shoulders and thereby hold the ends of the strip together; and a retaining member to keep the said shoulders in engagement with the said fastening device, substantially as described.

4. The combination with a rubber tire; of a fastening-strip extending through a longitudinal opening in said tire, the ends of the said fastening-strip being bent downward toward the periphery of the wheel; an independent fastening device comprising a ring or loop of metal to surround and engage the ends of the strip; and a retaining device consisting of a bolt having a head adapted to overlie the ends of the band and projecting through the said ring between the said ends and through the rim of the wheel, substantially as described.

5. The combination with the fastening-strip $a^2$ provided with the shoulders $a^4$ projecting toward the periphery of the wheel; the fastening-ring $a^3$ between the said band and the periphery of the wheel; and the bolt $d$ provided with the tapered head $d^2$, the ends of the strip being so shaped as to fit the said tapered head, substantially as described.

In testimony whereof I have signed my name to this specification in the presence of two subscribing witnesses.

DUDLEY H. BRADLEE.

Witnesses:
HENRY J. LIVERMORE,
NANCY P. FORD.